United States Patent [19]

Charboneau

[11] Patent Number: 5,595,140
[45] Date of Patent: Jan. 21, 1997

[54] LIVESTOCK FEEDER

[75] Inventor: Calvin A. Charboneau, Gerald, Mo.

[73] Assignee: Charboneau Enterprises, Inc., Gerald, Mo.

[21] Appl. No.: 611,566

[22] Filed: Mar. 6, 1996

[51] Int. Cl.[6] ........................................... A01K 1/10
[52] U.S. Cl. ............................................... 119/58
[58] Field of Search .................... 119/58, 59, 60

[56] References Cited

U.S. PATENT DOCUMENTS

| 42,927 | 5/1864 | Close | 119/58 |
|---|---|---|---|
| 45,011 | 11/1864 | Allerton | 119/58 |
| 54,371 | 5/1866 | Lahm | 119/59 |
| 62,522 | 3/1867 | Blanchard | 119/58 |
| 64,983 | 5/1867 | Ives | 119/58 |
| 2,500,889 | 3/1950 | Winkler | 119/58 |
| 2,936,735 | 5/1960 | Smith | 119/52 |
| 3,336,908 | 8/1967 | Swanson | 119/60 |
| 3,782,333 | 1/1974 | Feterl | 119/52 R |
| 3,834,353 | 9/1974 | Groezinger | 119/60 |
| 4,258,663 | 3/1981 | Schoessow | 119/58 |

OTHER PUBLICATIONS

Sales literature entitled "S. I. Feeders," Copyrighted 1989 by Schoessow, Inc.

Primary Examiner—Robert P. Swiatek
Assistant Examiner—Yvonne R. Abbott
Attorney, Agent, or Firm—Edward H. Renner

[57] ABSTRACT

A livestock feeder with the capability of removing the end walls and folding the side walls inwards. The livestock feeder has hinged side rails allowing them to be folded inwards. The livestock feeder also has a bottom bed that is not affected by weather and can be easily replaced. A removable polyethylene floor increases the life of the livestock feeder. When the end walls are removed and the side walls are folded, the feeder has a compact shape permitting efficient shipping by conventional transportation means.

18 Claims, 3 Drawing Sheets

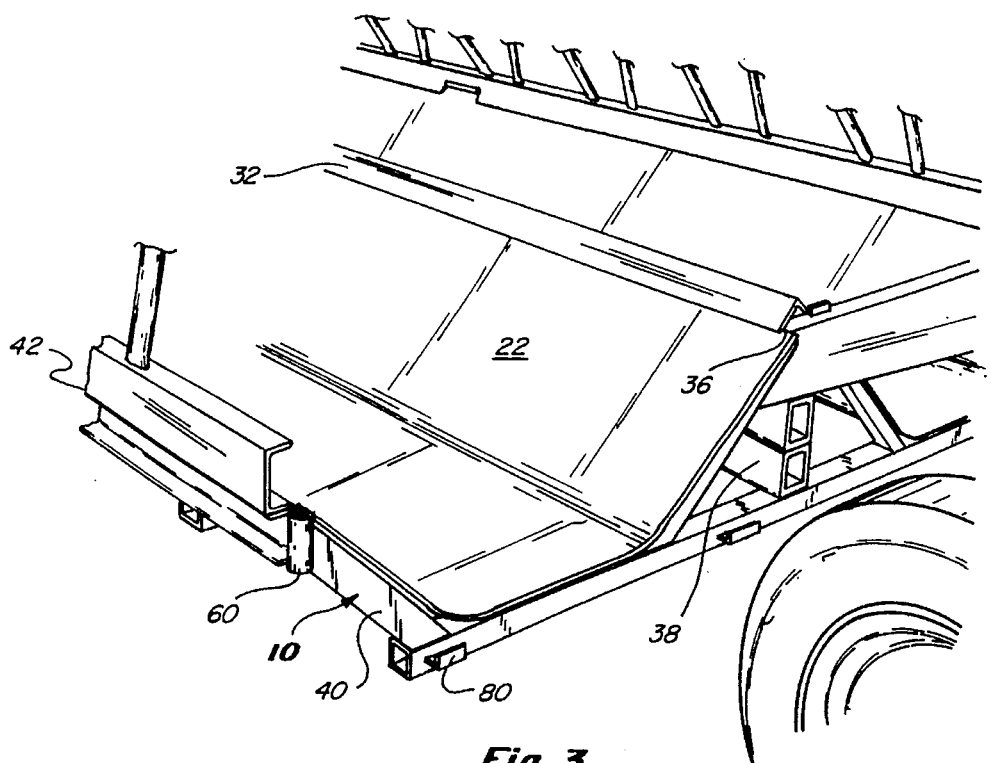
Fig. 3
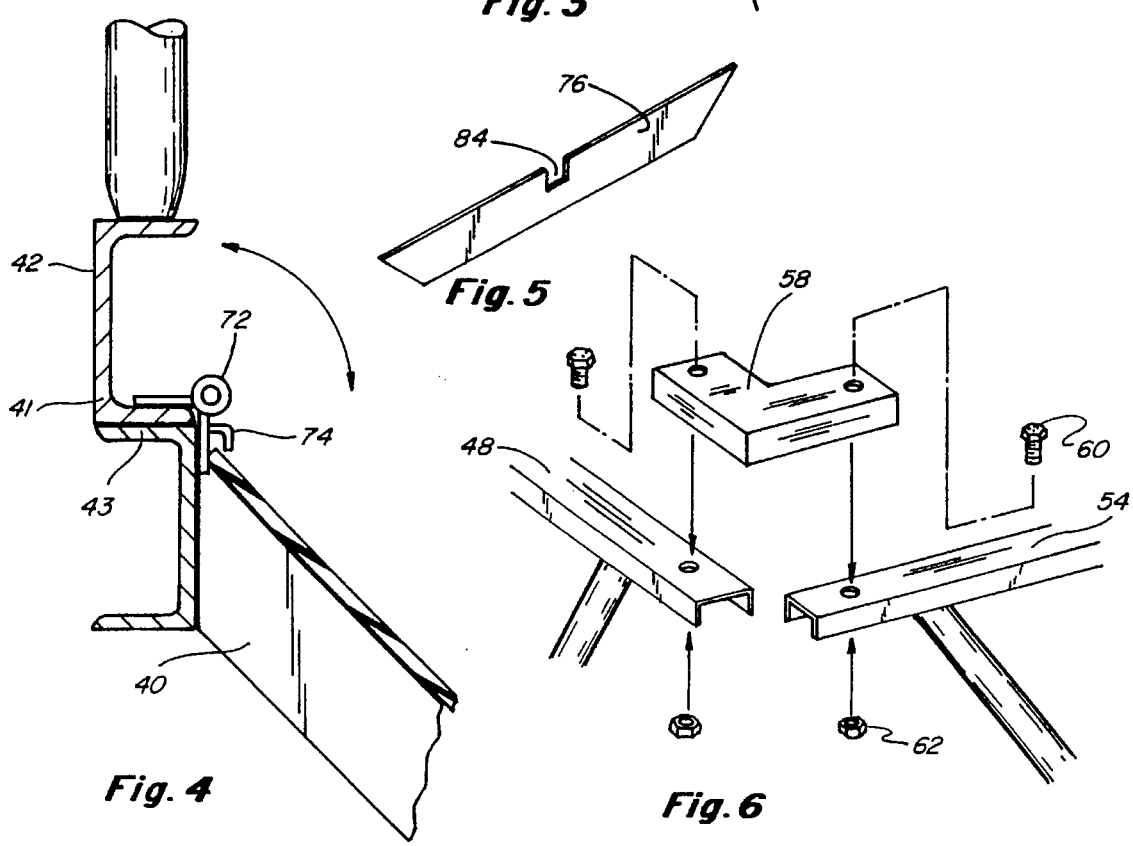
Fig. 4
Fig. 5
Fig. 6

LIVESTOCK FEEDER

FIELD OF THE INVENTION

This invention relates to the field of livestock feeders. More particularly, this invention is adapted to increase the life of livestock feeders and to decrease the shipping cost of livestock feeders.

BACKGROUND OF THE INVENTION

This invention relates to a mobile livestock feeder that has a longer life than the current livestock feeders and is adapted to reduce shipping costs. The invention uses removable end walls and folding side walls to decrease the height of the livestock feeder to allow more livestock feeders to be shipped in a conventional truck-trailer. The invention also uses a removable and replaceable bed which increases the life of the livestock feeder.

Livestock feeders may be used to efficiently dispense green feed, round bales, chopped hay, silage/haylage and other rations. For example, round hay bales may be placed inside a livestock feeder, a tractor may be hooked onto the feeder and rolled into the fields, then cattle can feed through the side frames.

A typical livestock feeder is rectangular in shape, has a solid fixed bed, two side rails and two end rails. The mobile feeders may be supported by a single axle at one end and have a steerable axle assembly at the other for hooking onto a tractor or other prime mover.

The side and end rails of conventional feeders are fixed to the bed, such as by welding. The rails may be round bars, spaced to allow livestock to insert their neck and head for feeding. The bars may be vertical and/or slanted and spaced to minimize feed loss from livestock pulling the feed out of the feeder.

Conventional livestock feeders have end and side rails fixed to the bed frame. The feeders are typically at least about four feet in height from the ground to the top of the rails, therefore a truck-trailer is not able to ship very many feeders at once, due to the height of stacked feeders. Since few feeders are shipped in a single load, the shipping cost per feeder is fairly high, adding to the consumer's overall cost of the livestock feeder. (There is no prior art livestock feeder capable of being reduced in size for shipping purposes, such as by temporarily removing or folding the rails.)

The bed of the typical livestock feeder is made of metal and may be painted. This metal may form a flat bed or may be angled from the middle toward the side rails to facilitate feeding and reduce feed waste. Once this bed has rusted or become worn from the weather and/or the feed additives, the livestock feeder is no longer useful. The typical livestock feeder has an expected life of about five years.

The present invention overcomes these and other disadvantages in a manner not revealed in the known prior art.

Applicants are aware of U.S. Pat. No. 4,258,663 and the sales brochure submitted herewith, the disclosures of which are incorporated by reference herein.

SUMMARY OF THE INVENTION

This invention provides a livestock feeder that is mobile and can be pulled behind any conventional tractor.

This livestock feeder has removable end walls that can be slid in and out of sockets easily and are held firmly in place by simple angle irons. The feeder also has folding side walls that bend at the lower edge about a hinge. The side walls fold toward the center of the feeder and rest across the bed frame. With the end rails removed and the side walls folded, the height of the livestock feeder is reduced and more feeders can be shipped in a single truck-trailer.

This invention has a greatly extended life over the average livestock feeder because the bottom bed is not affected by adverse weather or chemical additives. The invention may also provide a removable liner that can be replaced easily and at a minimum cost. Only one individual is required to slide the old liner from the bed frame and replace a new liner. Preferably the removable liner is a polymer sheet, such as polyethylene, PVC, and the like, that does not rust like the common steel bed, but it could also be aluminum sheet or even sheet steel, including stainless, which could be readily removed and replaced.

It is an object of this invention to provide livestock feeders that are less expensive due to reduced shipping and manufacturing costs.

It is an object of this invention to provide a livestock feeder with a life more than three times the average livestock feeder.

It is an object of this invention to provide a livestock feeder bed that does not rust on exposure to the elements.

It is another object of this invention to provide a livestock feeder with a removable bottom.

It is an object of this invention to reduce feed waste by having a bed that does not wear in inclement weather.

It is an object of this invention to provide a bed that can be easily replaced by a single person.

It is a further object of this invention to provide a livestock feeder with folding sides.

It is an object of this invention to provide a livestock feeder with a greatly extended life and a replaceable bottom bed that may require replacing in as many as about every 10 to 15 years.

The livestock feeder of the invention is inexpensive to manufacture, simple to use and efficient in operation. Further understanding of the invention may be obtained by reference to the Drawings and the Description of the Preferred Embodiments included herein.

DESCRIPTION OF THE DRAWINGS

FIG. 3 is a partial perspective view of FIG. 1;

FIG. 4 is a detail view of the side rail hinge;

FIG. 5 is a detail view of the front bed wall;

FIG. 6 is an exploded view of the bracket;

DESCRIPTION OF THE PREFERRED EMBODIMENTS

Figure 1:
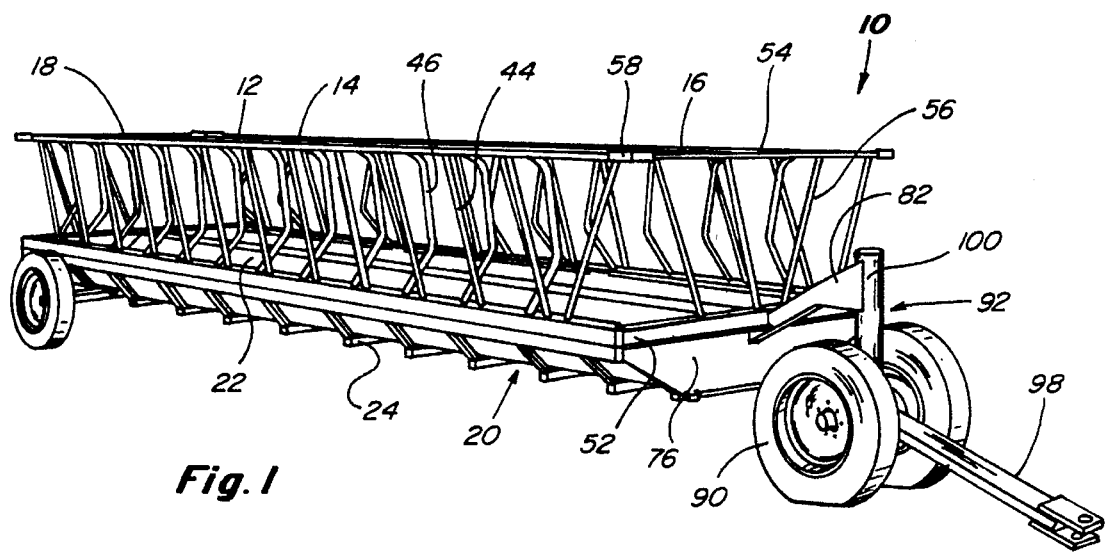
FIG. 1 is a perspective view of a livestock feeder according to the invention.

Referring now by reference numerals to the drawings and first to FIG. 1, the livestock feeder 10 is shown with a pair of opposed side walls 12, 14 and a pair of opposed end walls 16, 18, all extending upwardly from a bed frame 20. The bed frame is fitted with bed floor or liner 22 such as the polyethylene lining shown in FIG. 3.

Figure 7:
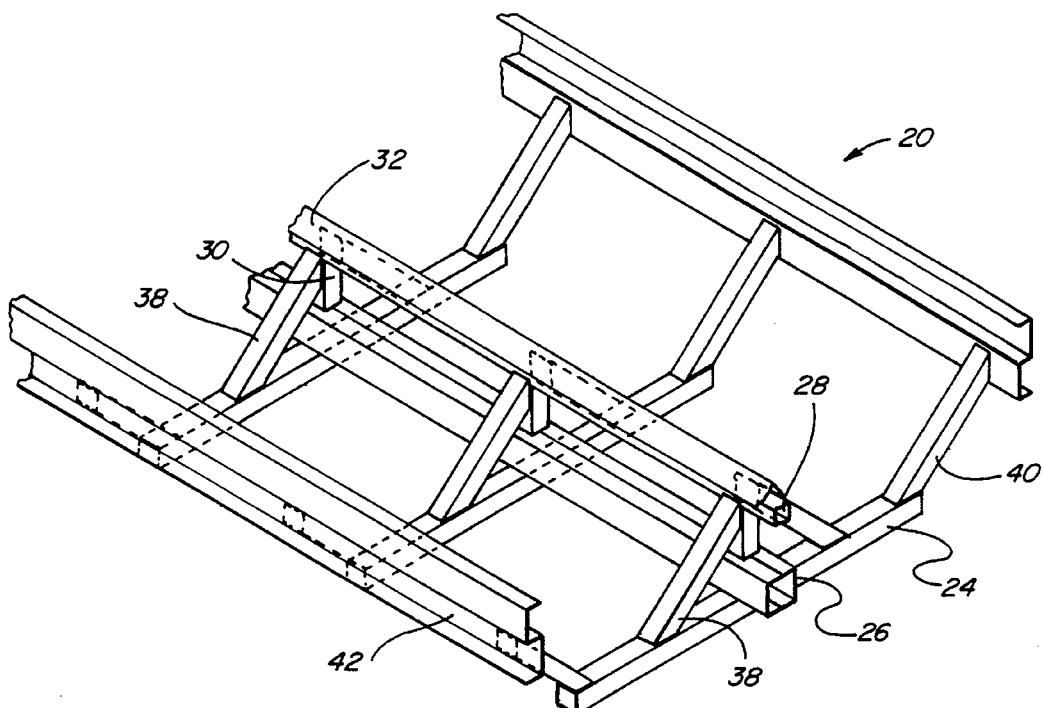
FIG. 7 is a partial perspective view of the bed frame.

As seen in FIGS. 1 and 7, the livestock feeder 10 has a bed frame 20 including multiple spaced horizontal members 24 running transversely for the length of the livestock feeder. For example, the spaced members shown are approximately 65 inches in length and are spaced approximately two feet from each other. A lower frame member 26 extends longitudinally down the center of the livestock feeder 10 and across the top of the spaced members 24 as shown in FIG. 7. This lower member 26 may be formed by welding two pieces of elongate channel iron together to form a hollow beam. Further, this lower frame member 26 may be permanently attached to the top of each undercrossed member 24, such as by welding. An upper frame member 28 extends approximately the entire length of the livestock feeder 10 and is positioned above the lower member 26 by multiple short, vertical supports 30, as shown. For example, the upper and lower frame members shown in FIG. 1 are approximately 20 feet long, the length of the feeder 10. The short, vertical supports 30 are fixed perpendicular to the upper frame member 28 and the lower frame member 26.

Figure 2:
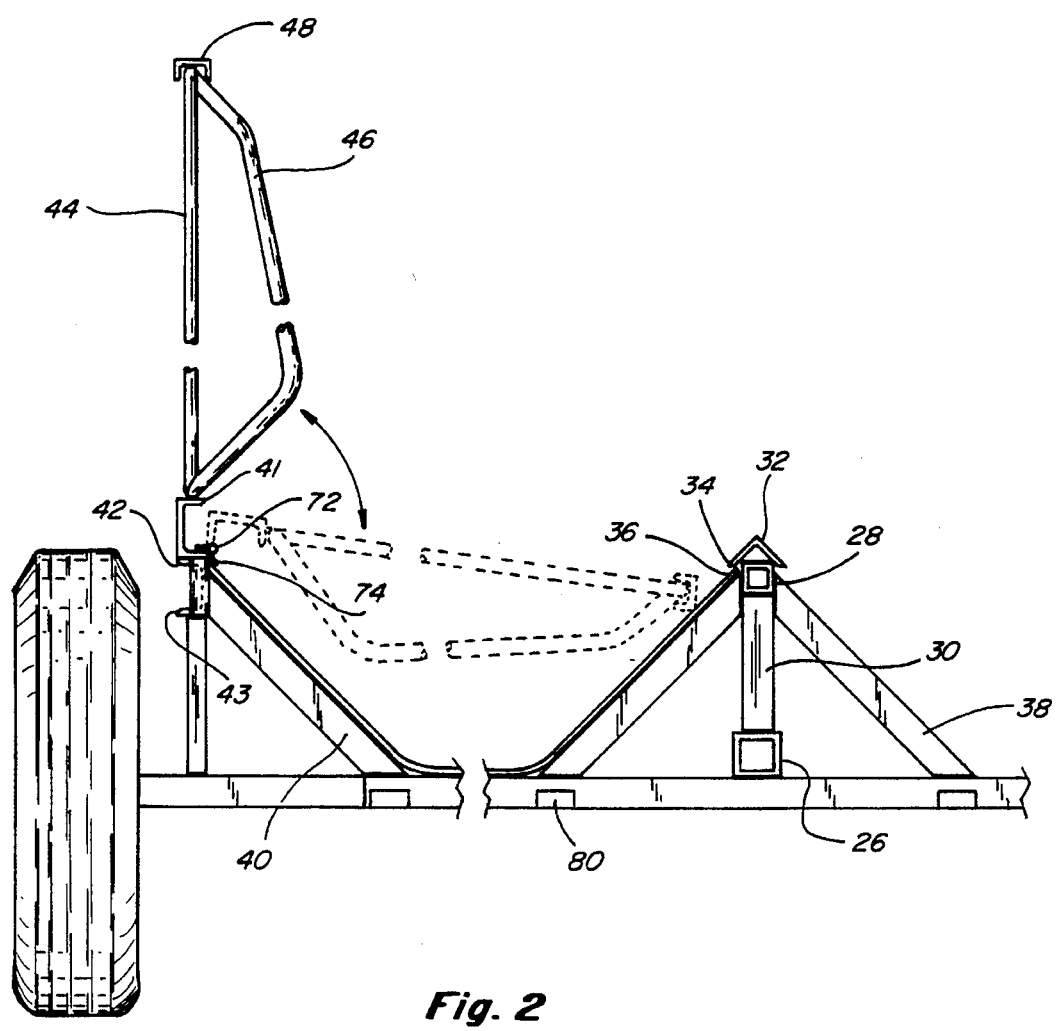
FIG. 2 is a partial rear elevational view of FIG. 1.

As can be seen in FIG. 2, an angle iron 32 is connected above the upper frame member 28 to form an "A" shape. The angle iron edges 34 overhang the upper member 28 to form a lip 36. This lip 36 is of sufficient length to hold the bed floor 22 in place, for example about one inch, and allows easy placement of the flooring.

Connected to and extending downwardly and outwardly from the upper frame member 28 are diagonal supports 38 terminating at the horizontal members 24, as shown in FIGS. 2 and 7. Similar diagonal supports 40 extend from the outer ends of the horizontal members 24 outwardly and upwardly to a lower side rail member 42. Together, the horizontal members 24 and the diagonal supports 38 and 40, generally define two feeding trough areas. The diagonal supports 38, 40 are of sufficient length to hold hay bales and other feeds, for example, the diagonal supports shown are between 1 and 1 ½ feet in length.

The opposed side walls 12, 14 have lower side rail members 42 and upper side rail members 48 extending approximately the length of the livestock feeder 10. The lower side rail member 42 may be formed from two pieces of channel iron positioned in an S-shape, and joined by hinge 72, such as shown in FIG. 4. The upper member 48 shown in FIG. 2 may be made of channel iron and inverted, as shown.

The opposed side walls 12, 14 have straight bars 44 and curved bars 46 extending between the upper 48 and lower side rail members 42. The straight bars 44 shown in FIGS. 1 and 2 are angled and spaced to permit an animal to insert its neck and head. The straight bars 44 shown are approximately 18 inches apart, for example. The curved bars 46 extend vertically and may also be spaced approximately 18 inches from each other; the curved and angled bars being interspaced. The curved bars 46 are bent inwardly towards the center of the livestock feeder 10 to define individual feeding areas for cattle standing side-by-side.

The opposed end walls 16, 18 have a lower end rail member 52 and an upper end rail member 54, with straight bars 56 extending between the rail members. The configuration shown in FIG. 1 shows bars 56 angled upwards and outwards from the center of the lower end rail member 52.

The lower side rail member 42 meets the lower end rail member 52 at approximately a 90° angle. Similarly, the upper side rail member 48 and the upper end rail member 54 are generally perpendicular. An upper side rail member 48 and an upper end rail member 54 may be held in place by a right angle channel iron 58, such as that shown in FIG. 6. Simple fasteners, such as bolts 60 and nuts 62, can then be used to hold the angled channel iron 58 in place. When the user wishes to remove the end walls 16, 18 or fold the side walls 12, 14, the angled channel iron 58 is removed by merely removing the fasteners 60 and 62.

Figure 8:
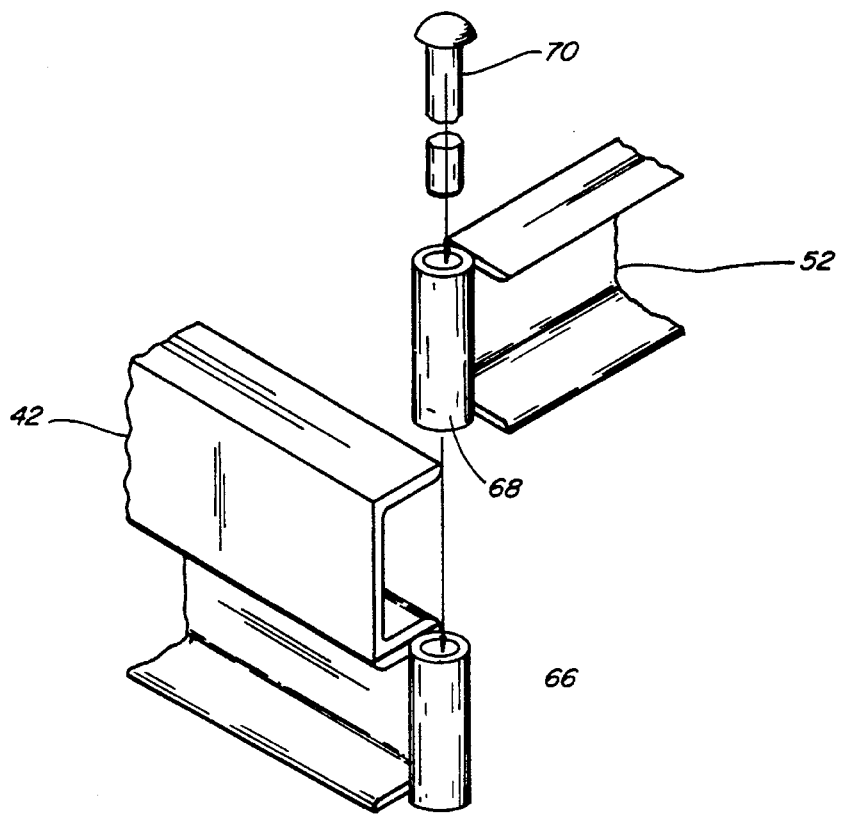
FIG. 8 is an exploded view of the pin and sockets.

The two lower end rail members 52 have sockets 66 located near both ends. The sockets 66 may be a hollow pipe welded to the end rail such as shown in FIG. 8. The lower side rail members 42 have mating sockets 68 located near both ends. The lower end rail socket 66 is aligned vertically with the lower side rail socket 68 when the end wall is placed on the livestock feeder, allowing a slidingly engageable pin 70 to extend through the two sockets 66 and 68. This facilitates steady placement and simple removal of the end walls 16, 18.

As seen in FIGS. 2 and 4, hinges 72 cooperate with the upper portion 41 and lower portion 43 of the opposed lower side wall members 42 to carry out the folding of the side walls 12, 14 from an upright position to a folded position. When folded, the side walls 12, 14 lie generally flat on top of the bed frame area. The hinge 72 allows the upper portion 41 of the lower side rail member 42 to fold inward, while the bottom portion 43 of member 42 remains stationary.

As best seen in FIG. 4, there is a retaining means 74 associated with the lower side rail members 42 and positioned inside the livestock feeder 10. It is of sufficient length to hold the bed floor 22 in place, and to allow easy placement of the floor. Retaining means 74 and lip 36 cooperate to hold the bed floor or liner 22 in a U-shape configuration generally defining two feeding troughs, as shown. The bed floor 22, such as the polyethylene liner shown, is sized to be easily slid in and out of the retaining means 74 and lip 36 and to be generally in contact with diagonal supports 38 and 40 and horizontal members 24. The liner and retaining means 74 and lip 36 also cooperate to allow the liner to be fixed in the feeder 10 by laying the liner on top of the bed frame 20 and pressing down on the liner, e.g., by walking on it, to extend it sufficiently for it to catch and become fixed under the retaining means 74 and lip 36.

End wall liners 76, 78 are positioned at the front and rear of the livestock feeder 10 to define the ends of the two feeding trough areas. The end liners 76, 78 have edges generally adjacent the horizontal member 24, diagonal supports 38 and 40 and lower end rail member 52. The end liners 76, 78 slide into the ends of the bed frame 20 and are held in place by retainers 80 fixed along the outer edge of horizontal members 24. FIGS. 2 and 3 show the preferred method of welding a clip 80 at spaced intervals along the outer edge of horizontal member 24. As seen in FIG. 5, the front end wall liner 76 has a cut-out portion 84 for the angled member 82 fixedly mounted to the bed frame 20.

The livestock feeder 10 is made mobile by mounting it on wheels 90. In FIG. 1, it can be seen that a pair of wheels 90 are mounted on an axle at the rear of the feeder 10 and a pair of wheels 90 are mounted on a steering assembly 92 connected to the front of the feeder 10.

The steering assembly 92 includes an axle 94 with an axle housing 96 (not shown). A towing arm 98 extends outwardly from the housing 96 for connection to a tractor that can pull the livestock feeder 10. A steering post 100 extends upwardly from the housing 96 for connection to an angled member 82 fixedly mounted to the front of the bed frame 20

As will be appreciated by those skilled in the art, the wheels, axles, steering and towing mechanisms may be conventional.

OPERATION OF THE DEVICE

A normal operation of the livestock feeder of this invention is as follows.

To ship the livestock feeder 10 of the invention, the four angled channel irons 58 are removed by unscrewing the bolts 60, then the front and rear walls 16, 18 can be lifted out of the bed frame 20. The opposed side walls 12, 14 are then folded towards the center of the livestock feeder 10 and allowed to rest in this position, as shown in phantom in FIG. 2. The height of the livestock feeder 10 has now been reduced by approximately half, allowing more livestock feeders to be shipped in a conventional truck-trailer and thus reducing shipping costs.

To use the livestock feeder 10, the user merely swings the side walls 12, 14 back to an upright position. The end walls are placed at the front and back of the livestock feeder 10 and the sockets 66 of the end walls are aligned with the sockets 68 of the side walls to allow pins 70 to be slid through the sockets 66 and 68. The corner channel irons 58 are then replaced.

When it is necessary to replace the liner 22, the user slides the end wall 18 out, then pulls the two worn pieces of bed liner 22 outward from the frame 20. Another liner is then placed in the frame. If the liner is a flexible sheet, the user may place the liner on top of the frame and press the liner in place by walking along the liner and the liner will catch within the two side channels 36, 76 to form a new liner 22. The liner is now in place and the end wall 18 can be replaced.

Although the invention has been described by making detailed reference to preferred embodiments, such detail will be understood by those skilled in the art as instructive rather than in any restrictive sense. Many other variants are possible within the scope of the claims hereunto appended. The invention is not to be limited to the specifics shown here for purposes of illustration, but only by the scope of the appended claims and their equivalents.

I claim:

1. A livestock feeder comprising:
   (a) a bottom bed frame including horizontally spaced members of substantially equal length extending from a first end to a second end and diagonally spaced members extending outwardly from each of the first and second ends to form a U-shaped configuration;
   (b) a pair of side walls pivotally connected to the bottom bed frame;
   (c) a pair of end walls extending upwardly from the bottom bed frame;
   (d) front and rear wheels supporting the livestock feeder;
   (e) a pair of guide members positioned between the side walls and the diagonally spaced members; and
   (f) a flexible bed floor extending between the side walls and secured by the guide members.

2. The livestock feeder of claim 1, in which:
   (g) the side walls include generally vertical, spaced bars.

3. The livestock feeder of claim 2, in which:
   (h) the side walls include generally slanted, spaced bars.

4. The livestock feeder of claim 1, further comprising:
   (g) a hinge pivotally connecting the side walls to the bed frame.

5. The livestock feeder of claim 1, further comprising:
   (g) a socket located at an end of side wall; and
   (h) a socket located at an end of an end wall generally in vertical alignment with the side wall socket to allow a pin to extend through both sockets for removal and replacement of the end wall.

6. The livestock feeder of claim 1, further comprising:
   (g) an upper frame member extending longitudinally generally at the center of the feeder; and
   (h) a diagonal support extending from the upper frame member to the horizontally spaced members to form two adjacent U-shaped configurations.

7. The livestock feeder of claim 6, in which:
   (i) the bed floor is two pieces of material generally lining the two U-shaped configurations to form two troughs.

8. The livestock feeder of claim 7, in which:
   (j) the floor is made from polyethylene.

9. The livestock feeder of claim 6, further comprising:
   (i) a guide member positioned along the upper frame member for securing the bed floor.

10. A livestock feeder comprising:
    (a) a bottom bed frame including horizontally spaced members of substantially equal length extending from a first end to a second end and diagonally spaced members extending outwardly from each of the first and second ends to form a U-shaped configuration;
    (b) a pair of side walls pivotally connected to the bottom bed frame, the side walls having opposed ends and a socket at each end;
    (c) a hinge pivotally connecting the side walls to the bed frame;
    (d) a pair of end walls extending upwardly from the bottom bed frame, the end walls having opposed ends and a socket at each end;
    (e) front and rear wheels supporting the livestock feeder;
    (f) a pair of guide members extending the length of the side walls and positioned at the juncture of the side walls and the diagonally spaced members; and
    (g) a flexible bed floor extending between the side walls and secured by the guide members.

11. The livestock feeder of claim 10, further comprising:
    (h) a pin for sliding engagement with an end wall socket and side wall socket.

12. In a livestock feeder having feed containing areas and feeding positions permitting livestock to obtain access to feed contained in the feed containing areas the improvement comprising:
    a side wall pivotally connected to the livestock feeder, the side wall being movable from an upright position, by pivoting, to a lower position, substantially reducing the effective stacking height of the livestock feeder and permitting reduced shipping volume for a plurality of stacked livestock feeders and an end wall slidingly engageable to the livestock feeder, the end wall being movable from an engaged position to a position where the end wall is no longer connected to the livestock feeder, effectively permitting reduced shipping volume for a plurality of stacked livestock feeders.

13. The livestock feeder of claim 12 further comprising: a hinge pivotally connecting the side wall to the livestock feeder.

14. The livestock feeder of claim 13 further comprising:
    a socket located near a bottom end of the end wall and a socket located near a bottom end of the side wall aligned to allow a pin to be slidingly engaged through both sockets.

15. The livestock feeder of claim 12 wherein the livestock feeder has a removable bed liner in the feed containing areas, the liner being selectively removable and replaceable to increase the life of the feeder.

16. The livestock feeder of claim 15 wherein the removable liner is made from polyethylene.

17. In a livestock feeder having feed containing areas and feeding positions permitting livestock to obtain access to feed contained in the feed containing areas the improvement comprising:

a removable liner in the feed containing areas made from flexible material and held in place by a guide member along one side and by a retaining member along another side for selective removable and replacement to increase the life of the feeder, the livestock feeder having a side wall pivotally connected to the livestock feeder for movement from a first position upright to a second position living generally across the feed containing area and substantially reducing the effective stacking height of the livestock feeder, and having an end wall slidingly engageable to the livestock feeder, the end wall being movable from an engaged position to a position where the end wall is no longer connected to the livestock feeder, effectively permitting reduced shipping volume for a plurality of stacked livestock feeders.

18. In a livestock feeder having A feed containing area and feeding position permitting access by livestock to feed contained in the feed containing area the improvement comprising:

a removable bed in the feed containing area permitting easy removal and replacement of the bed when worn or damaged to extend the useful life of the livestock feeder and means for reducing the stacking height of the livestock feeder to reduce shipping volume, the height reducing means including pivotable side walls, the pivotable side walls having slanted bars alternating with inwardly extending curved bars the alternating bars defining the feeding position and the curved bars cooperating with the bed and interfitting therewith to reduce the stacking height of the livestock feeder.

\* \* \* \* \*